3,629,143
REGENERATOR FOR METAL HALIDE
SLUDGE CATALYST
William S. Reveal, Orinda, Calif., assignor to
Shell Oil Company, New York, N.Y.
Filed Apr. 10, 1969, Ser. No. 815,128
Int. Cl. B01j 11/02, 11/80
U.S. Cl. 252—411                                  1 Claim

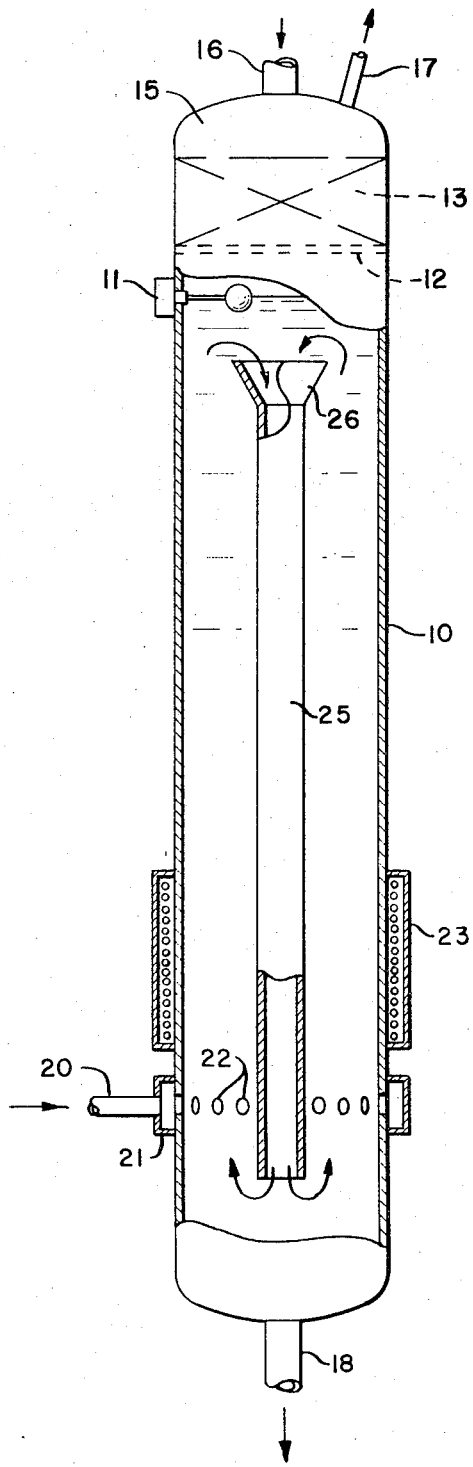

ABSTRACT OF THE DISCLOSURE

Metal halide catalyst sludges can be restored to activity after a period of use by being introduced into a regenerator consisting of an outer vessel, a concentric draft tube within the vessel, means for supplying hydrogen and means for supplying heat to the space between the vessel and the draft tube, means for removing hydrogen above a liquid level maintained in the vessel, and means for introducing sludge and removing reactivated catalyst from the vessel.

BACKGROUND OF THE INVENTION

Metal halides have long been used as catalysts for a variety of hydrocarbon conversion reactions. The metal halides, typically aluminum chloride, promote different reactions when employed with different charges and under different conditions. Metal halide catalysts are useful to promote alkylation, cracking, disproportionation, isomerization, hydrogenation, and many other reactions.

The metal halide catalysts typically react with or associate with the hydrocarbon being converted to form a dark viscous sludge. The sludge is an active catalytic material itself but after a period of use the catalytic activity of the sludge declines. It is known that treating sludge under conditions to effect hydrogenation will restore the catalytic activity by increasing the free metal halide content of the sludge, but accomplishing this process to any significant extent has proved difficult.

Hydrogenation of sludge is an exothermic reaction. However, even though the reaction is exothermic, high temperatures are required to initiate it. As a result, hydrogenation of catalyst sludge frequently creates runaway temperature conditions that produce carbonaceous hydrocarbon materials such as coke, as well as hazardous conditions. The exothermic nature of hydrogenation not only results in the difficulties mentioned above, but it limits the time that a catalyst can be exposed to hydrogenation conditions so that low rates of regeneration are characteristic of catalyst regeneration processes. For example, conventional processes for hydrogenation of a metal halide sludge will produce on the order of 1–2% of free aluminum chloride when the regeneration is effected under conditions that avoid runaway temperatures.

This invention provides a regenerator and a process for regeneration of metal halide catalyst sludges which avoids or greatly mitigates the above-noted problems. The regenerator of this invention includes an outer vessel and an inner tube which is preferably concentric with the outer vessel so that an annular space is formed between them. The inner tube opens above the bottom of the outer vessel and below the top of the outer vessel so that internal circulation of a liquid phase within the vessel may be effected through the tube. The regenerator of this invention also includes means for introducing hydrogen in the space between the inner tube and the outer vessel and a means of introducing heat in the space between the inner tube and the outer vessel. The regenerator also includes means for removing hydrogen from the upper portion of the vessel and means for introducing spent catalyst sludge into the vessel and removing regenerated catalyst sludge from the vessel. Preferred embodiments of the invention also include a means for maintaining a liquid level above the inner tube in the vessel and a packed space above the liquid level for effecting an advantageous counter-current contact between hydrogen and in-coming spent catalyst sludge.

The invention also includes the process for regenerating spent catalyst sludge which involves introducing spent catalyst sludge and hydrogen into the vessel described above whereby a density difference causes internal circulation upwardly in the space between the inner tube and the vessel and downwardly through the inner tube, and regeneration is effected at conditions approaching isothermal conditions to avoid runaway temperatures and to employ the exothermic heat of reaction for pre-heating the incoming charge. As will be shown in the subsequent description, the regenerator described above and operated as described above causes many beneficial effects compared with conventional means for effecting regeneration.

The regenerator and the regeneration process of the present invention will produce 4–8 times the amount of regeneration compared with a conventional regenerator of the same volume. Although the much greater degree of regeneration produced is a great advantage by itself, another advantage of the regenerator and the process of this invention is that good temperature control is provided so that exothermic heat of reaction is used to heat the charge and conversely the charge is used to control the reaction heat. Thus, runaway temperatures are avoided while still operating at a high enough temperature so that the reaction progresses at a reasonable rate, and the amount of external energy supplied to the process to initiate and maintain the reaction is greatly reduced.

The process and apparatus of the present invention can best be described with reference to the accompanying drawing which is presented to illustrate one device and one process embodying the invention. Although as stated above the process and apparatus of this invention are used to regenerate metal halide-hydrocarbon sludges that are formed from many processes and with many metal halide catalysts, the invention will be characterized by describing the regeneration of an aluminum chloride catalyst sludge that was employed to promote the alkylation of isobutane with ethylene.

The drawing is a partly schematic sectional elevation view of a regenerator useful for the present invention and it is illustrated without valves, pumps, and other conventional items of apparatus that would normally be employed with such a device.

The illustrated regenerator includes an outer vessel 10 in which a body of liquid is maintained by a liquid level controller 11 at the level illustrated. A perforated plate or other suitable support 12 is employed to maintain a body of packing 13 above the liquid level. A vapor space 15 is in the upper portion of the column and an inlet for catalyst sludge 16 is maintained in the upper portion as well as an outlet 17 for removing gas from the space above the packing.

In the lower portion of the vessel an outlet 18, for removing regenerated catalyst, is maintained.

Hydrogen is supplied through line 20 to a header 21 which discharges hydrogen through openings 22 in the side of the vessel 10. A heater illustrated schematically as 23 is also provided, and this heater may employ any heat exchange medium sufficient to provide the temperature required, or preferably, it may comprise electric strip heaters.

The vessel is provided with an inner tube 25, illustrated herein as being concentric with the vesesl, and terminating a distance above the bottom head of the vessel and a distance below the top head of the vessel and below the liquid level maintained in the vessel. The inner tube 25 is illustrated with a flared top 26, the purpose of which will be subsequently described.

In operation, the vessel 10 is filled with catalyst sludge up to the level maintained by level controller 11. Spent catalyst sludge introduced through line 16 descends through the packing 13 and joins the main body of sludge in the vessel. Hydrogen is introduced through ports 22 and bubbles upwardly in the annular space between vessel 10 and the inner tube 25. The hydrogen causes the material in the annular space to be less dense than the material in the tube 25 and accordingly circulation is established so that sludge flows upwardly in the annular space and downwardly through tube 25.

Heat is supplied through heater 24 until the temperature of the sludge is sufficient for hydrogenation of hydrocarbon to be effected. As a result aluminum chloride is regenerated from the sludge and hydrogenated hydrocarbons are produced. When the sludge reaches the top of the flared portion 26, hydrogen disengages from the liquid phase, passes through the packing 13 and is removed through line 17. In passing through the packing 13, the hydrogen is countercurrently contacted with incoming sludge thereby heating the incoming sludge and saturating it with hydrogen. The incoming sludge joins the main body of sludge in the regenerator, cools the heated sludge and at the same time is pre-heated, and passes downwardly through inner tube 25. During passage through inner tube 25 reaction of sludge with dissolved hydrogen will occur and, upon discharging from the bottom of tube 25, the mixture of regenerated sludge and fresh sludge reverses its flow and passes upwardly through the annular space being joined by hydrogen through ports 22 and being heated, if necessary, by heater 23.

It may be seen, that a large portion of the circulating stream is partly regenerated catalyst sludge which acts as a heat sink and as a diluent to prevent runaway temperatures in the annular space. However, the diluent is not inert and in fact it is benefited by each circulation through the system. The operation of the system approaches an isothermal operation, not only because of the circulation and diluting effect, but also because of heat exchange between the material in the annular space and the material in tube 25. The body of liquid in vessel 10 is at a substantially higher activity level than the sludge introduced through line 16. The reactivated catalyst drawn off through line 18 is drawn off at a rate that maintains the liquid level in the vessel fairly constant, which is approximately the rate at which spent catalyst is added to the vessel 10. Liquid level controller 11 may operate a valve in line 16 to regulate incoming catalyst flow but it preferably operates a valve in line 18 to regulate the outflow of catalyst.

The device illustrated in the figure may be modified in many ways within the scope of the invention. By way of example and without limitation, the inner tube 25 may rest on the bottom head of the vessel 10 and its outlets may be slots or holes drilled through the side walls of the tube. Hydrogen may be injected through any suitable means such as jets passing through the bottom head or several large pipes with diffusing devices on the ends thereof. It is desirable that the hydrogen be distributed as small bubbles in order to maintain good contact between the liquid and gas phases and any conventional means for providing this function may be employed. The inner tube 25 is shown with a flared top 26 which is for the purpose of providing a gradual increase in velocity as the material going downwardly through inner tube 25 enters the tube. This flared top provides disengaging space for hydrogen so that bubbles will not enter the tube 25 thereby reducing the density differential between the annular space and the interior of the tube. This flared top may be eliminated or it may be substituted with equivalent devices for gradually increasing the velocity.

The packing 13 may be eliminated completely or substituted with other vapor-gas contacting devices when desired. Spent catalyst may be introduced into the bottom of the vesesl 10 or anywhere along the sides and it may be withdrawn from any point in the vessel although it is preferred that the spent catalyst be introduced at a point that is far separated from the point of withdrawal. Since the regeneration reaction is a hydrogenation reaction, high pressures will favor conversion and the reaction rate. Therefore, as much as is consistent with the other processing variables and with the engineering problems high pressures within the regenerator 10 are preferred.

As a specific example of the regeneration process of this invention the following is provided.

Aluminum chloride sludge from a process wherein ethylene is reacted with isobutane to produce the corresponding hexane is introduced in the upper portion of the vessel 10 through line 16. The sludge contains about 25 percent of free aluminum chloride and the remainder of the sludge is aluminum chloride complexed with hydrocarbon. The body of sludge within the vessel is maintained at a temperature of about 190° C. and it approaches isothermal conditions although the temperature of the material in the annular space is somewhat higher than the temperature of the material within the tube 25. The vessel is maintained at a pressure of 900 p.s.i. by controlling the rate at which hydrogen is removed through line 17, and electric strip heaters 23 are employed initially to initiate the hydrogenation reactions and intermittently thereafter to control the temperature. The particular regenerator employed is 9.5 inches inside diameter and about 65 feet high while the draft tube is 3 inches in diameter and about 52 feet long. The liquid level is maintained about 5 feet above the top of the tube 25.

Spent catalyst is introduced through line 16 at a rate of about 2500 lbs. per hour and withdrawn through line 18 at a rate sufficient to maintain the liquid level substantially constant. It is estimated that the catalyst circulates about 20 times per hour through the center tube.

Regeneration of the same amount of catalyst in a regenerator similarly constructed but without the center tube 25, was performed. The latter regenerator produced an improvement in the spent catalyst sludge, measured as the increase in free aluminum chloride content, of 1.3 percentage points. The regenerator of the present invention having the same dimensions produced an improvement of 7.0 percentage points in the amount of free aluminum chloride produced in the regeneration process. Not only was there a drastic increase in the amount of free aluminum chloride produced, but the substantially isothermal operation of the regenerator of the present invention removed entirely the dangers of runaway temperature with its adverse effects on the sludge and on the equipment, and it additionally provided temperature control where none existed before and savings in the energy required to provide heat to the regeneration process.

What is claimed is:

1. A process for regenerating aluminum halide-hydrocarbon catalyst sludge comprising:
    (a) maintaining a body of catalyst sludge within a vessel to a level above the top of an inner tube spaced from the vessel wall, said inner tube opening above the bottom of said vessel,
    (b) introducing hydrogen into the space between the tube and the vessel wall, whereby circulation of sludge is established flowing upwardly in the annular space and downwardly through the inner tube,
    (c) heating the sludge in the space between the tube and the vessel wall to a temperature at which hydrogenation is initiated,
    (d) maintaining a liquid level in the vessel and removing hydrogen from above the liquid level, (e) adding spent catalyst to the body of catalyst sludge within the vessel, and
(f) withdrawing regenerated catalyst from the body of catalyst sludge within the vessel.

References Cited

UNITED STATES PATENTS

| | | | |
|---|---|---|---|
| 1,079,278 | 11/1913 | Wilbuschewitsch | 28—288.3 |
| 2,378,685 | 6/1945 | Carney | 260—683.74 |
| 2,890,251 | 6/1959 | Flavin et al. | 260—683.53 |
| 3,188,286 | 6/1965 | Van Driesen | 23—288.3 |
| 3,210,292 | 10/1965 | Evans et al. | 252—411 |
| 3,288,567 | 11/1966 | Graham | 23—288.3 |
| 3,313,849 | 4/1967 | List et al. | 23—288.3 X |
| 3,425,955 | 2/1969 | Hepp et al. | 252—411 |
| 3,488,280 | 1/1970 | Schulman | 208—10 |

DANIEL E. WYMAN, Primary Examiner

P. E. KONOPKA, Assistant Examiner

U.S. Cl. X.R.

23—288 B; 208—13; 260—683.57, 683.74